US008587339B2

(12) United States Patent
Johnson

(10) Patent No.: US 8,587,339 B2
(45) Date of Patent: Nov. 19, 2013

(54) MULTI-MODE DRIVER WITH MULTIPLE TRANSMITTER TYPES AND METHOD THEREFOR

(75) Inventor: Samuel R. Johnson, Frisco, TX (US)

(73) Assignee: PMC-Sierra US, Inc., Sunnyvale, CA (US)

( * ) Notice: Subject to any disclaimer, the term of this patent is extended or adjusted under 35 U.S.C. 154(b) by 85 days.

(21) Appl. No.: 13/154,370

(22) Filed: Jun. 6, 2011

(65) Prior Publication Data
US 2012/0307931 A1 Dec. 6, 2012

(51) Int. Cl.
*H03K 19/094* (2006.01)
*H04L 27/00* (2006.01)

(52) U.S. Cl.
USPC .................................. 326/82; 375/295

(58) Field of Classification Search
USPC ......................................................... 326/82
See application file for complete search history.

(56) References Cited

U.S. PATENT DOCUMENTS

| | | | |
|---|---|---|---|
| 6,531,896 B1 * | 3/2003 | Song | 326/86 |
| 6,882,491 B2 * | 4/2005 | Tretter | 360/68 |
| 6,954,100 B2 * | 10/2005 | Dharne et al. | 327/333 |
| 7,245,156 B2 * | 7/2007 | Yeung et al. | 326/86 |
| 7,443,211 B2 * | 10/2008 | Liu | 327/108 |
| 8,149,024 B2 * | 4/2012 | Liu et al. | 327/108 |
| 8,222,929 B1 * | 7/2012 | Kwan | 327/108 |
| 8,242,803 B2 * | 8/2012 | Wu et al. | 326/30 |
| 2012/0250427 A1 * | 10/2012 | von Kaenel | 365/189.11 |

* cited by examiner

*Primary Examiner* — Shawki Ismail
*Assistant Examiner* — Nelson Correa
(74) *Attorney, Agent, or Firm* — TIPS Group

(57) ABSTRACT

A multi-mode driver with multiple transmitter types including a first transmitter coupled to a transmission channel and operative to output a signal for transmission on the channel and a second transmitter coupled to the channel and operative to output the signal for transmission on the channel, the second transmitter having at least one different output characteristic than the first transmitter. During the output of the signal from one of the transmitters, the other of the transmitters is biased with a bias supply voltage that prevents voltage breakdown of one or more transistors of the other transmitter.

16 Claims, 3 Drawing Sheets

MULTI-MODE DRIVER WITH MULTIPLE TRANSMITTER TYPES AND METHOD THEREFOR

BACKGROUND

High-speed digital interfaces have become widespread with modern technology's emphasis on rapid transfer and communication of digital data for an ever-increasing amount of important functions, from video conferencing to data storage. These interfaces include high-speed transmitters for transmitted data at high rates, such as gigabit speeds. A number of types of high-speed transmitters are used in a variety of applications, including current mode logic (CML), voltage mode logic (VML), and others.

The different types of high-speed transmitters have been specified to accommodate practical speed-to-power tradeoffs. One trend is to reduce the performance of a high-speed transmitter in order to keep the power low enough for applications having a high number of input/output (I/O) ports. For the majority of channels the lower performance may be adequate; however, this level of performance may present significant challenges on more difficult channels, such as channels having increased noise and/or having greater physical length. These difficult channels may in some cases require a separate re-driver or repeater component to improve transmitter and receiver performance.

In most communications devices, high speed transmitters can either be efficient with lower performance and lower power consumption, or be powerful with higher performance and higher power consumption. Rarely can transmitters be both efficient and powerful. Therefore, for example, a designer must pick one option early in the design process of a transmitter, to either use an efficient type of transmitter (such as VML) for appropriate conditions such as short transmission distances, or to use a higher-amplitude, powerful transmitter type (such as CML) for conditions such as long transmission distances or otherwise difficult channels. These restrictions allow little flexibility in the eventual use and applications of devices using these transmitters.

These and other limitations of the prior art will become apparent to those of skill in the art upon a reading of the following descriptions and a study of the several figures of the drawing.

SUMMARY

A multi-mode driver, set forth by way of example and not limitation, includes a first transmitter coupled to a transmission channel and operative to output a signal for transmission on a transmission channel, and a second transmitter coupled to the transmission channel and operative to output the signal for transmission on the transmission channel, the second transmitter having at least one different output characteristic than the first transmitter. During the output of the signal from one of the transmitters, the other of the transmitters is biased with a bias supply voltage that prevents voltage breakdown of one or more transistors of the other transmitter.

In another multi-mode driver, set forth by way of example and not limitation, a first transmitter is coupled to a transmission channel and is operative to output a differential signal for transmission on the transmission channel, where the first transmitter outputs the signal within a first power range. A second transmitter is coupled to the transmission channel and operative to output the differential signal for transmission on the transmission channel, the second transmitter outputting the signal within a second power range lower than the first power range. Only one of the first transmitter and the second transmitter is outputting the differential signal at any one time. During the output of the differential signal from the first transmitter, the second transmitter is biased with a bias supply voltage having an amplitude that tracks a varying amplitude of the output of the first transmitter, thus preventing voltage breakdown of one or more transistors of the second transmitter.

A method for operating a multi-mode driver, set forth by way of example and not limitation, includes, in a first mode, outputting a signal for transmission from a first transmitter of the multi-mode driver on a transmission channel. In a second mode, the signal is output from a second transmitter of the multi-mode driver on the transmission channel, the second transmitter having at least one different output characteristic than the first transmitter. During the output of the signal from one of the transmitters, the other of the transmitters is biased with a bias supply voltage that prevents voltage breakdown of one or more transistors of the other transmitter.

These and other combinations and advantages and other features disclosed herein will become apparent to those of skill in the art upon a reading of the following descriptions and a study of the several figures of the drawing.

BRIEF DESCRIPTION OF THE DRAWINGS

Several examples will now be described with reference to the drawings, wherein like components are provided with like reference numerals. The examples are intended for the purpose of illustration and not limitation. The drawings include the following figures.

DETAILED DESCRIPTIONS

In the following descriptions, signal transmitters will be discussed with reference to the specific examples such as CML and VML types. These examples are not to be seen as limiting but, rather, illustrative of the general concepts set forth herein.

Figure 1:
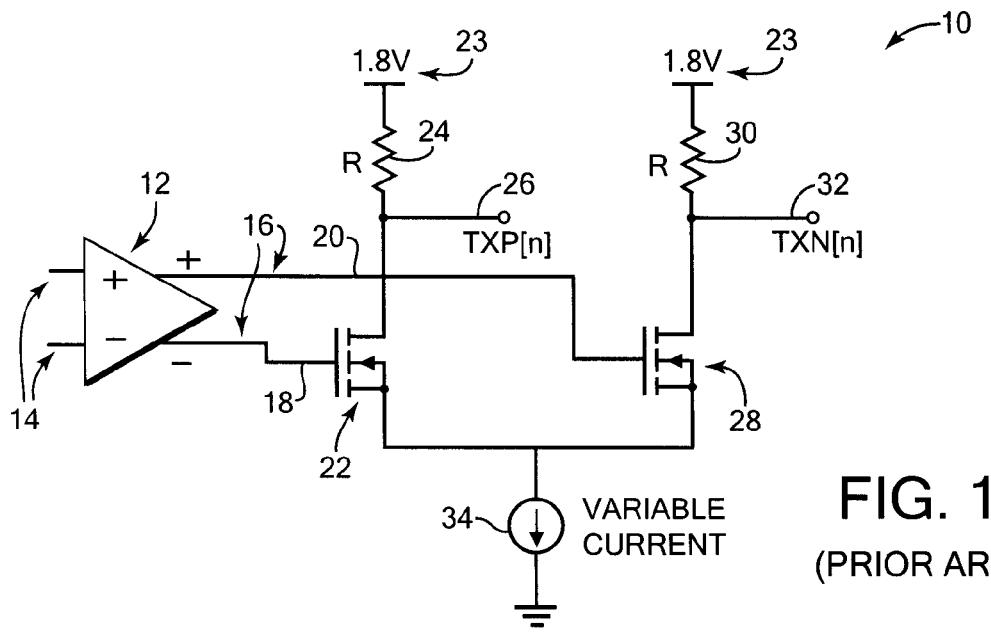
FIG. 1 is a schematic diagram of a standard CML (current mode logic) transmitter used for transmitted high-speed digital data.

FIG. 1 is a schematic diagram of a standard CML (current mode logic) transmitter 10 used for transmitting high-speed digital data. The CML type of transmitter is typically implemented using CMOS technology and can achieve higher power than other types of digital transmitters, and is often used to transmit signals over more difficult channels and longer distances.

CML transmitter 10 includes a pre-amplifier 12 which receives a differential signal 14. Pre-amplifier 12 may have multiple stages of gain and increases the power of the signal to drive the output stage of the transmitter. The pre-amplifier outputs a differential signal 16 having a negative signal 18 and a positive signal 20.

The negative signal 18 is provided from the pre-amplifier 12 to the gate of a transistor 22, such as an n-channel MOSFET as shown. Transistor 22 has a drain coupled to a termination resistor 24, and resistor 24 is coupled to a CML voltage supply 23, which can be 1.8 V as shown. A transmit positive output terminal 26 is coupled between the resistor 24 and the drain of transistor 22.

Similarly, the positive signal 20 is provided from the pre-amplifier 12 to the gate of a transistor 28, such as an n-channel MOSFET. Transistor 28 has a drain coupled to a termination resistor 30, and resistor 30 is coupled to the CML voltage supply. A transmit negative output terminal 32 is coupled between the resistor 30 and the drain of transistor 28. For example, termination resistors 24 and 30 can each have a resistance of 50 ohms when driving 50 ohm transmission lines.

A variable current source 34 is coupled to the source terminals of the transistors 22 and 28. The current source 34 controls the amplitude and the change in voltage seen at the output terminals 26 and 32. By adjusting the current of the current source 34, the amplitude and power of the output transmitted signal can be adjusted and have a larger signal.

In some implementations, logic or other control circuitry (not shown) is included in the pre-amplifier 12 or connected to other components of the transmitter 10 which allows input control signals to control characteristics of the transmitter, such as the amplitude of the output signal.

The CML transmitter 10 operates by steering the variable current through either the termination resistor 24 or the termination resistor 30 to output a logic "1" or "0". The differential input signal 16 from the pre-amplifier 12 switches the transistors 22 and 28 to be on one at a time, such that when one of the transistors 22 or 28 is on, the other is off. The variable current from the current source 34 travels through either the resistor 24 and transistor 22, or through the resistor 30 and transistor 28, and causes the voltage swing at the outputs. When the positive input is high on line 20, the output 26 goes to the high level, which is a voltage less than the supply 23 as determined by the circuit (including resistance of the load connected to the terminals 26 and 32, e.g. a 100-ohm load), and the output 32 goes to a low level, which is a voltage less than the high level as determined by the current source 34.

The transistors in the transmitter 10 typically have a limit as to how much voltage can be provided across any of their terminals, where voltages greater than the limit can cause breakdown of the transistor. For example, voltages from gate to source or from drain to source can be limited, especially when the transmitter 10 is implemented using a deep submicron technology. In one example, when using a 65 nm semiconductor deep submicron process, the resulting transistors may have a voltage limit of about 1.1 volts across their terminals.

The CML transmitter 10 performs well for higher-power applications such as difficult communication channels. The maximum single-ended amplitude is limited by the allowable voltage stress on the steering transistors, and so the maximum single-ended amplitude is about equal to the maximum allowable device voltage. For example, using the voltage and devices shown, an almost 1.0 V single-ended output voltage can be achieved. High speeds are facilitated because substantially only the drains of the transistors contribute capacitance to the transmitter output. However, this transmitter does not have high efficiency. For example, if the transistor 22 is off and the transistor 28 is on, the current flows through the resistor 30 and through the 100-ohm downstream load. Since the termination resistors 24 and 30 are connected in parallel with the downstream load, only 25% of the current flows through the downstream load, such that 25% of the power is sent downstream. Therefore the transmitter is 25% efficient, which is half of the ideal efficiency of 50% when the destination load impedance equals the source load impedance.

Figure 2:
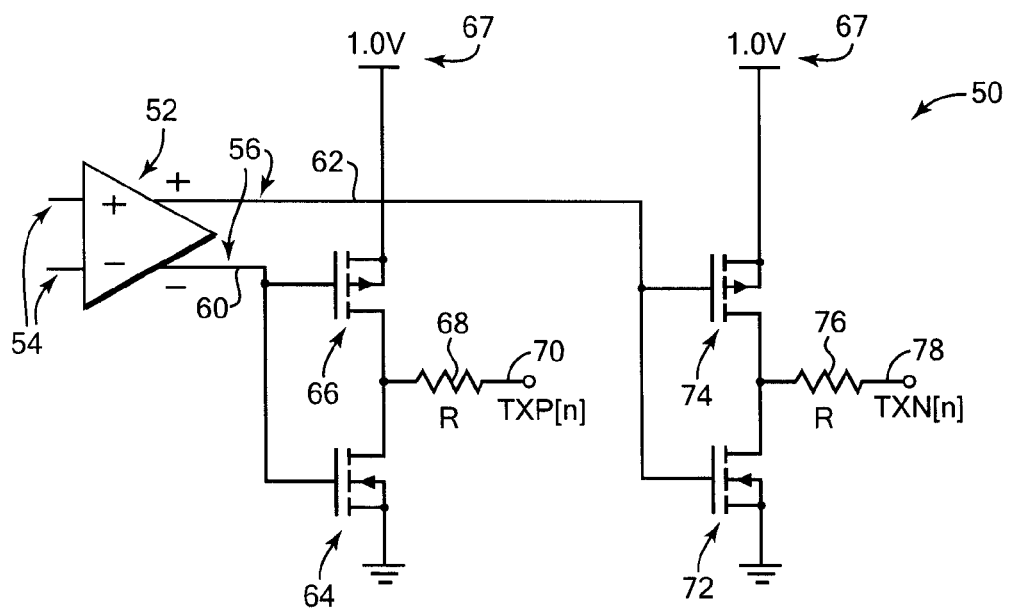
FIG. 2 is a schematic diagram of a standard VML (voltage mode logic) transmitter used for transmitted high-speed digital data.

FIG. 2 is a schematic diagram of a standard VML (voltage mode logic) transmitter 50 used for transmitting high-speed digital data. The VML type of transmitter is typically implemented using CMOS transistors. The VML transmitter can achieve lower power consumption and better power efficiency than some other types of digital transmitters, but provides lower power and is not as capable of transmitting over difficult channels as the CML transmitter described with reference to FIG. 1.

VML transmitter 50 includes a pre-amplifier 52 which receives a differential signal 54. Pre-amplifier 52 may have multiple stages of gain and increases the power of the signal to drive the output stage of the transmitter. The pre-amplifier outputs a differential signal 56 having a negative signal 60 and a positive signal 62.

The negative signal 60 is provided from the pre-amplifier 52 to the gate of a transistor 64, which is an n-channel MOSFET in the example shown. Transistor 64 has a source coupled to ground and a drain coupled to a termination resistor 68. The negative signal 60 is also provided to the gate of a transistor 66, which is a p-channel MOSFET in the example shown. Transistor 66 has a drain coupled to the termination resistor 68 and a source coupled to a VML voltage supply 67, which can be 1.0 V as in the example shown. A transmit positive output terminal 70 is coupled to the resistor 68.

Similarly, the positive signal 62 is provided from the pre-amplifier 52 to the gate of a transistor 72, such as an n-channel MOSFET. Transistor 72 has a drain coupled to a termination resistor 76. The positive signal 62 is also provided to the gate of a transistor 74, which is a p-channel MOSFET in the example shown. Transistor 74 has a drain coupled to the termination resistor 76 and a source coupled to the VML voltage supply 67. A transmit negative output terminal 78 is coupled to the termination resistor 76.

Termination resistors 68 and 76 can, for example, have a resistance of 50 ohms when driving a 50 ohm transmission line, to help increase the signal integrity performance by preventing reflections due to poor impedance matching of transmission line and load termination. In some implementations, logic or other control circuitry (not shown) is included in the pre-amplifier 52 or connected to other components of the transmitter 50 which allows input control signals to control characteristics of the transmitter, such as the amplitude of the output signal.

The VML transmitter 50 outputs either the positive supply voltage (VML supply) or the negative supply voltage (ground). Each of the signals 60 and 62 of the differential input signal 56 from the pre-amplifier 52 switches the transistors 64, 66, 72, and 74 accordingly. For example, if the positive signal 62 is high, then transistor 72 is on and transistor 74 is off. In such a case, the negative signal 60 is low, causing transistor 66 to be on and transistor 64 to be off. Thus, at one time transistors 64 and 74 are on and transistors 66 and 72 are off, and at a different time transistors 66 and 72 are on and transistors 64 and 74 are off.

VML transmitter 50 uses the NMOS and PMOS transistors to help drive both the falling and rising signal edges of the output signals. For example, if the positive signal 62 is high and negative signal 60 is low, the current in the circuit travels through the transistor 66, the resistor 68 and output terminal 70, through a 100 ohm load, and back to the terminal 78, resistor 76, and transistor 72. Similarly, if the negative signal 60 is high and positive signal 62 is low, current travels through transistor 74, resistor 76, and output terminal 78, through the 100 ohm load, and back through terminal 70, resistor 68, and transistor 64. Thus, both branches of the differential circuit are being driven. The termination resistors 68 and 76 are provided in series with the downstream load, and a greater efficiency is provided than in the CML circuit described above with respect to FIG. 1. For example, an efficiency of 50% can be obtained using the VML transmitter 50.

The transistors in the VML transmitter 50 have a limit as to how much voltage can be provided across any of their terminals, where voltages greater than the limit can cause breakdown of the transistor. These voltages are especially limited in a deep submicron technology. In one example, when the transmitter 50 is implemented using a deep submicron technology such as a 65 nm semiconductor process, the resulting transistors can have a voltage limit of about 1.1 volts across their terminals, similarly to the transistors of the CML transmitter 10 example described above. In the VML transmitter 50, the smaller voltage supply than in the CML transmitter typically prevents this limit from being exceeded despite the transistors seeing the full supply voltage.

The VML transmitter 50 performs well for high speed data transmission at lower power levels than those allowed with the CML transmitter 10 but at higher efficiency. In these examples, a 1.0 V supply is used instead of a 1.8 V supply as in CML, allowing the VML transmitter 50 to use lower power and smaller, more power efficient devices. When the load impedance is equal to the termination resistance, the single-ended amplitude is one-half of the supply voltage. Thus, in this example, the single-ended voltage is limited to about 0.5 V in the VML circuit, as opposed to a single-ended voltage of 1.0 V that can be provided using the CML circuit. The VML transmitter also does not have components such as a variable current source that allows direct adjustment of this source to adjust the currents and voltages used for the output signals.

Figure 3:
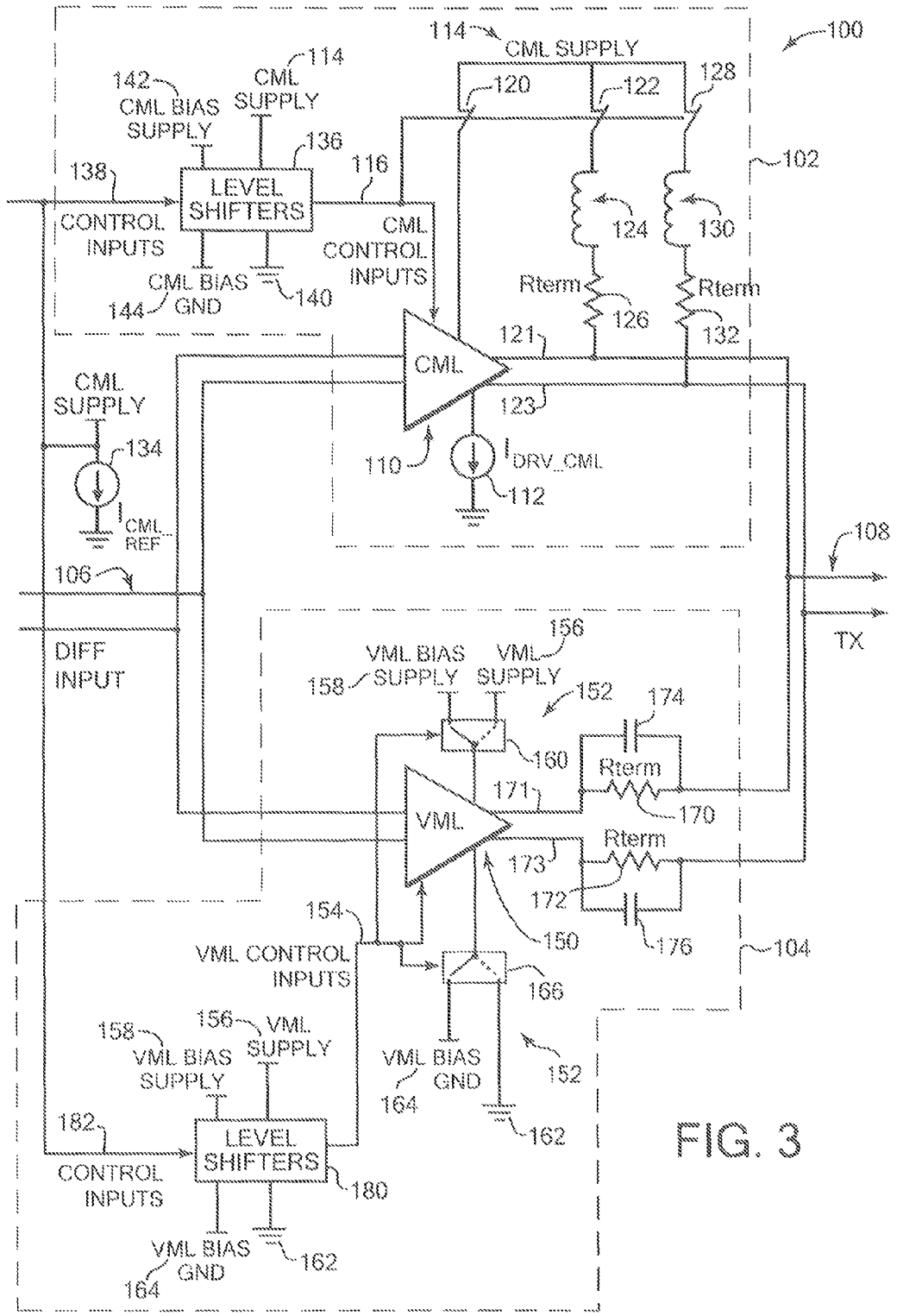
FIG. 3 is a schematic diagram illustrating one embodiment of a multi-mode driver according to features described herein.

FIG. 3 is a schematic diagram illustrating one embodiment of a multi-mode high-speed driver 100 according to features described herein. Driver 100 is operative to provide at least two types of high speed transmitters, which in the example of FIG. 3 are all connected to a single output. For example, suitable high speed drivers can operate at gigabit speeds in some embodiments. The driver 100 is operating in a transmission mode when a type of transmitter associated with that mode is operating to output a signal. In some embodiments, such as the example of FIG. 3, only one of the types of transmitters is outputting the signal at any one time.

The multiple types of transmitters in driver 100 have at least one different output characteristic from each other. For example, in embodiments such as the example of FIG. 3, one type of transmitter provides a higher range of power in output signals (e.g. greater output voltage swing) but has lower efficiency, and the other type of transmitter provides a lower range of power in output signals (e.g. smaller output voltage swing) but has higher efficiency. In the embodiment of FIG. 3, the higher power transmitter type is CML and the lower power transmitter type is VML. However, other types of transmitters can be used in other embodiments, such as LVDS (Low Voltage Differential Signaling), PECL (Positive/Pseudo Emitter Coupled Logic), LVPECL (Low Voltage Positive Emitter Coupled Logic), etc., using similar features as appropriate. The multi-mode operation described herein can be provided in implementations using deep-submicron technology having transistors with lower voltage limitations, without causing voltage breakdown of the transistors in the transmitters and minimizing impact of one transmitter on the output signal quality of the other transmitter. For example, custom pseudo-supply biasing and level shifting help prevent breakdown of transmitter transistors and disconnecting key elements of one transmitter or the other isolates the influence of one transmitter on the other.

The driver 100 can be used for a number of different applications, such as communications, storage, servers, video, or any application using high-frequency differential signal line drivers. Multiple drivers 100 can be connected to a device, each driver 100 offering independent selectability as to the transmitter type used. For example, some devices may include multiple ports to which a variety of other devices can be connected. In one example, an interface device may be connected to local devices or components, such as a CPU or video card, or to other devices or components that are external or located some distance away from the interface device, such as a hard drive or other storage device located in a different housing. This interface device can use the multi-mode driver of the present invention at each of one or more ports, allowing flexibility in the types of devices or components connected to each such port. For example, ports that connect local devices can select the VML transmitter for use, and ports that connect external devices or other long and/or difficult channels can select the CML transmitter for use. For example, the interface can include PCIe, Firewire, USB, SONET, or other type of data transmission standard. The selection of transmitter type (such as VML or CML in the described example) can be made by a processor, CPU, or other connected controller/controller circuit. The multi-mode driver avoids the need to provide a higher power transmitter type for all ports, or having to provide repeaters or re-drivers in a lower power transmitter type used over longer transmission distances.

In the embodiment example of FIG. 3, driver 100 includes a higher power (e.g., CML) transmitter 102 and a lower power (e.g., VML) transmitter 104. In some embodiments, these transmitters 102 and 104 can be implemented on a single circuit board or other substrate, while in other embodiments the transmitters can be implemented on multiple circuit boards and/or other substrates. A differential input signal 106 is provided to both transmitters 102 and 104, the signal provided by a suitable component of an electronic device such as a controller, microprocessor, buffer, or other electronic component. An output signal 108 is provided as an output of the driver 100 and is transmitted on an appropriate transmission channel to a load. For example, the channel can be a typical 50 ohm channel and the load specified as 100 ohms. Other channel and load resistances can be used in other embodiments.

CML transmitter 102 includes a driver control stage 110, a variable current source 112, a CML voltage supply 114, and CML control inputs 116. Driver control stage 110 includes a pre-amplifier and two transistors, similarly as explained above for the standard CML circuit of FIG. 1. Driver control stage 110 also includes control circuitry including transistors and/or logic which receive the CML control inputs 116 to control the operation of the CML transmitter 102, the implementation of which is well-known.

Variable current source 112 is used to provide a current $I_{DRV\_CML}$ that sets the current used in the output signals of the CML transmitter 102, similarly as the variable current source described above in the CML circuit of FIG. 1. The variable current source 112 can be controlled using the CML control inputs 116 and the driver control stage 110. In some embodiments, the current source 112 is derived from a reference current source as described below.

A CML supply 114 provides an operating voltage for the CML transmitter 102. In this example, the CML supply provides a greater voltage than the VML supply (described below). In some embodiments, the CML supply 114 can provide 1.8 V similarly as described above for the CML transmitter of FIG. 1. The CML supply 114 is connected to the driver control stage 110 by a switch 120. In addition, the CML supply 114 is connected to one line 121 of the differential output 108 by a switch 122, an inductor 124, and a termination resistor 126, all connected in series with each other between the CML supply 114 and the line 121, and connected in parallel with a load connected at the transmission output 108. Similarly, the CML supply 114 is connected to the other line 123 of the differential output 108 by a switch 128, an inductor 130, and a termination resistor 132 that are connected in series with each other between the CML supply 114 and the output line 123, and connected in parallel with the load connected at the transmission output 108. In some embodiments, the switches 120, 122, and 128 can be transistors, and in some implementations, these transistors can be MOSFETS similar to those used in the CML driver control stage 110 and in VML, transmitter 104 (described below). In some embodiments, the switches 120, 122, and 128 are transistors provided from a deep submicron technology, such as a 65 nm process, and therefore have the same voltage limitations as the transistors within the CML driver stage 110 as described above with respect to FIG. 1. The capacitance of switches 122 and 128 can be made small to reduce loading onto the output and reduce interference with the VML driver during its operation. The termination 126 and 132 can have a resistance of 50 ohms in some embodiments, and can be similar to the termination resistors 24 and 30 shown in FIG. 1.

CML control inputs 116 are provided to the driver control stage 110. The control inputs 116 can control a variety of functions of the CML transmitter 102, including controlling the current $I_{DRV\_CML}$ of the current source 112, amplitude settings of the output signal, wave shaping of the output signal, control of switches 120, 122, and 128, and other standard adjustments.

The CML control inputs 116 are derived from control inputs 138 that are provided to the driver 100 from a control source, such as core logic implemented by software, a processor, a controller, or other source. This control source can be located on the same semiconductor chip as the driver 100, or a different chip or substrate. For example, these control inputs 138, and thus the operation of CML transmitter 102, can be programmable in software running on a processor, within registers of a processor, using logic, or otherwise programmable.

In some embodiments, part of the control inputs 138 are used to control the amplitude of an adjustable reference current source 134, which in this example is connected to the CML supply 114. Reference current source 134 is used in some embodiments to supply several other currents used in the driver 100. The reference current source 134 is mirrored to create the current $I_{DRV\_CML}$ in variable current source 112 that is connected the CML driver control stage 110 and controls the amplitude of the output transmitted signal of the CML transmitter 102. Thus the control inputs 138 control the output amplitude of CML transmitter 102 using the reference current source 134.

The reference current source 134 can also be mirrored to create bias current sources used to provide the CML and VML bias voltages described herein. Since the current sources created from the reference current source 134 are all relative to each other and to the output signal amplitude of the CML transmitter 102, these currents inherently track the output signal amplitude and can be used to create bias voltages that maximize performance of the driver 100 without exceeding voltage tolerances. The bias voltages are described in greater detail below and with respect to FIGS. 4 and 5.

The reference current source 134 can be mirrored to create the CML and bias current sources using any of well-known mirror circuits that include, for example, one or more transistors for each mirrored current source. For example, in some embodiments, the mirrored current sources created from the reference current source 134 can be scaled to provide different desired current amplitudes by adjusting the transistor sizes in the mirrored current sources relative to the size of the transistor in the reference current source 134.

Level shifters 136 can be included to receive control inputs 138. The control inputs 138 are level shifted by the level shifters 136 from control voltage levels to appropriate voltage levels for use with the CML transmitter 102. Different control inputs can be shifted to different levels depending on required voltage levels needed to control particular standard characteristics of the driver control stage 110 such as wave shaping and amplitude. In addition, the CML supply 114 and ground 140 provide the CML voltage range to the level shifters 136 (such as up to 1.8 V in the described example). In some embodiments, the level shifters 136 shift the CML voltage to a fixed voltage that is applied for the control signals 116 that are connected to the switches 120, 122, and 128. The fixed voltage can be lower than the CML supply voltage 114 but sufficiently high such that a voltage less than the breakdown voltage of the switch transistors 120, 122, and 128 is applied across the terminals of these switch transistors. For example, if deep submicron transistors are used (such as 65 nm process), the switch transistors 120, 122, and 128 may have a voltage limit of about 1.1 volts. In such an embodiment, if the CML supply is about 1.8 volts, the fixed voltage can provide about 0.8 volts such that about 1.0 volt is applied to the gates of switches 120, 122, and 128, which is under the breakdown voltage. In other embodiments, different types of transistors can be used for switches 120, 122, and 128 which do not need the level shifting to avoid breakdown or which use a different degree of level shifting.

A CML bias supply 142 and CML bias ground 144 can also be connected to the level shifters 136 in some embodiments to apply the CML bias voltage range to the CML transmitter 102. These inputs allow the level shifters to provide a bias voltage to some of the control inputs provided to CML driver stage 110, where the bias voltage tracks the current output voltage of the CML transmitter 102. This tracking protects transistors within the driver stage 110 which have a voltage limit over which breakdown occurs. For example, if using transistors provided from a deep submicron process such as 65 nm, this limit is under the CML supply voltage. The bias voltage causes particular control inputs 116 that are provided to the transistors in the driver stage 110 to be at an appropriate voltage level that tracks the CML output voltage and never allows a voltage greater than the voltage limit of these transistors to be applied across any of their terminals, thus avoiding breakdown of the transistors in the driver stage 110. The CML bias supply 142 and CML bias ground 144 are described in greater detail below with respect to FIG. 4.

Driver 100 also includes VML transmitter 104, which in this example includes a driver control stage 150, a voltage supply switching mechanism 152, and VML control inputs 154. Driver control stage 150 includes a pre-amplifier and four transistors, similarly as explained above for the standard VML circuit of FIG. 2. Driver control stage 150 also includes control transistors and/or logic which receive the VML control inputs 154 to control the operation of the VML transmitter 104, the implementation of which is well-known.

The voltage supply switching mechanism 152 is used to selectively apply a VML bias voltage to the VML transmitter 104 during operating mode of the CML transmitter 102. The switching mechanism 152 includes a VML supply 156, a VML bias supply 158, a supply switch 160, a ground 162, a bias ground 164, and a ground switch 166. The VML supply 156 provides an operating voltage for the VML transmitter 104, similarly as described above with respect to FIG. 2. For example, in some embodiments the VML supply provides 1 volt to the driver control stage 150. In this example, the VML supply 156 provides a lower voltage than the CML supply 114. The VML bias supply 158 provides an operating voltage for the VML driver control stage 150 that tracks the output voltage (and the current $I_{DRV\_CML}$) of the CML stage 102. This allows the voltage seen across the terminals of the transistors of the VML driver control stage 150 to not exceed the voltage limitations of the those transistors, thereby avoiding voltage breakdown, as described in greater detail below. The supply switch 160 connects either the VML supply 156 or the VML bias supply 158 to the VML driver control stage 150.

The ground 162 provides a ground voltage level for the driver control stage 150 to be used with the VML supply 156, and a VML bias ground 164 provides a biased ground that provides the desired voltage range when used with the VML bias supply 158. The ground switch 166 connects either the ground 162 or the VML bias ground 164 to the VML driver control stage 150, where ground 162 is connected if VML supply 156 is connected, and VML bias ground 164 is connected if VML bias supply 158 is connected.

A termination stage at the output of the VML transmitter includes termination resistor 170 connected in series with the output line 171, and a termination resistor 172 connected in series with the output line 173. These resistors can each be 50 ohms, for example, and are similar to the termination resistors 68 and 76 shown in FIG. 2. In addition, a shunt capacitor 174 can be connected in parallel with the termination resistor 170, and a shunt capacitor 176 can be connected in parallel with the termination resistor 172.

VML control inputs 154 are provided to the driver control stage 150. The control inputs 154 can control a variety of functions of the VML transmitter 104, including controlling the on or off state of the VML transmitter 104 (output squelch), pre-cursor, post-cursor, wave shaping of the output signal, amplitude adjustments, and other standard adjustments.

The VML control inputs 154 are derived from control inputs 182 provided from a control source, such as core logic implemented by software, a processor, a controller, or other source. The control source can be located on the same semiconductor chip as the driver 100, or a different chip or substrate. These control inputs 182, and thus the operation of VML transmitter 104, can be derived from control inputs programmable in software running on a processor, within registers of a processor, using logic, or otherwise programmable. In some embodiments, as shown in FIG. 3, all or some of the control inputs 182 can be the same signals used in the control inputs 138 provided to the CML transmitter 102 of the driver 100 to allow either the CML transmitter 102 or VML transmitter 104 to be used with the same control signals to output the input differential signal 106 as output signal 108.

Level shifters 180 can be included to receive control inputs 182 and level shift these inputs 182 to appropriate voltage levels for use with the VML transmitter 104. Different control inputs can be shifted to different levels depending on required voltage levels needed to control particular standard characteristics of the logic and driver stage 150 such as wave shaping and amplitude. The VML supply 156 and ground 162 provide the VML voltage range (such as 1.0 V in the described example) to the level shifters 180 to shift appropriate control inputs to the 1.0 V range when the VML transmitter 104 is in operation and outputting a signal for transmission.

The VML bias supply 158 and VML bias ground 164 are also connected to the level shifters 180. During CML mode when the VML transmitter 104 is not in operation, these bias inputs allow the level shifters to provide a bias voltage to some of the control inputs provided to VML driver stage 150. This allows the voltage levels of these inputs to track the current output voltage of the CML transmitter 102, protecting the transistors within the VML driver stage 150 from seeing any voltages over their breakdown voltage. For example, if a deep submicron technology is used for the transistors in stage 150, these transistors may have a breakdown voltage under the output voltage of the CML transmitter 102. The bias voltage causes the particular control inputs 154 that are provided to these transistors to be at an appropriate voltage level that never allows a voltage greater than the voltage limit of these transistors to be applied across any of their terminals, thus avoiding breakdown of the transistors in the driver stage 150. The VML bias supply 158 and VML bias ground 164 are described in greater detail below with respect to FIG. 5.

The driver 100 operates as follows. In CML mode, the CML transmitter 102 is selected to output the differential signal 106 by using appropriate control inputs 138 and 182 from the control source. The CML control inputs 116 turn on the transistors 120, 122, and 128 to allow the CML supply voltage 114 to power the CML transmitter 102. The CML control inputs 116 also control the current $I_{DRV\_CML}$ to control the amplitude of the output signals. The output signals of the CML transmitter 102 are output on the transmission output lines 108. The voltage of these output signals is also provided at the lines 171 and 173 of the VML transmitter 104 which are connected to the transmission output lines 108. Appropriate CML control inputs 116 are level shifted by level shifters 136 to make sure that voltages across the terminals of the transistors 120, 122, and 128 and transistors in the CML control stage 110 are under the voltage breakdown limit for these transistors.

In response to the CML mode being selected, in the VML, transmitter 104 the control inputs 182 cause the VML control inputs 154 to shut down operation of the VML transmitter 104, e.g., enter a "squelch mode" in which a high impedance is created at the output of the VML, control stage 150 (e.g., stops the control stage 150 from switching and power output goes to zero) so that the VML transmitter reduces interference with the CML transmitter. The VML bias supply 158 and the VML bias ground 164 are used by the level shifters 180 to shift the voltage of the VML control inputs 154. Since the voltage at the output of the VML control stage 150 is provided by the CML transmitter 102, the VML control inputs 154 provided to the VML control stage 150 are shifted using the bias voltage such that the difference in voltages between each of these VML control inputs 154 and the output of the stage 150 is less than the voltage limit of the transistors in the stage 150. For example, this voltage limit can be about 1.1 volts for deep submicron technologies such as 65 nm process MOSFETS. Furthermore, the supply switch 160 and the ground switch 166 are controlled to connect the VML bias supply 158 and the VML bias ground 164 to the VML control stage 150 such that voltages across the transistors of the stage 150 are between the bias voltage and the CML voltage seen at the output of the VML stage 150 (in some embodiments, any transient signals caused by this switching can be filtered and/or only affect the signal at the time of switching modes). Since the VML bias supply 158 and VML bias ground 164 track the output voltage of the CML transmitter 102, the voltage limit is maintained across the transistors of the VML control stage 150 regardless of the voltage level of the CML transmitter 102 as seen at the output of the VML stage 150. This prevents any breakdown of the transistors of the VML transmitter 104 during operation of the CML transmitter 102. Thus, this pseudo supply biasing allows maximizing the potential output amplitude of the CML transmitter in CML mode without exceeding voltage breakdown limits of the transistors in the VML transmitter.

In VML mode, the VML transmitter 104 is selected to output the differential signal 106 by using appropriate control inputs 138 and 182 from the control source. The control inputs 182 cause the VML control inputs 154 to enable operation of the VML transmitter 104, e.g., a low impedance is created at the output of the VML control stage 150. The VML supply 156 and the ground 162 are used by the level shifters 180 to shift the voltage of appropriate VML control inputs 154 to the standard VML voltage (e.g., 1.0 V as in the example of FIG. 2) instead of the VML bias voltage range. Furthermore, the supply switch 160 and the ground switch 166 are controlled to connect the VML supply 156 and the VML ground 162 to the VML control stage 150 such that the standard VML voltages are used in the VML driver control stage 150. The output signals of the VML transmitter 104 are output on the transmission output lines 108.

In response to the VML mode being selected, in the CML transmitter the CML control inputs 116 turn off the transistors 120, 122, and 128 to disconnect the CML supply voltage 114 from the CML logic driver stage 110 (using transistor 120) and from the output lines 121 and 123 (using transistors 122 and 128) to reduce interference with the VML transmitter. The CML control inputs 116 also control the current $I_{DRV\_CML}$ to shut down the output signals.

The series inductors 124 and 130 of the CML transmitter 102, and the shunt capacitors 174 and 176 of the VML transmitter 104, are passive elements used as peaking devices or "boost" elements that reduce the output capacitance effects from their associated transmitter during non-operation to maintain reasonable rise and fall times of the output signal from the operating transmitter. For example, the inductors 124 and 130 at the CML transmitter output compensate for the capacitance at the drains of the transistors in the VML driver control stage 150, and the shunt capacitors 174 and 176 at the VML transmitter output compensate for the capacitance of the drains of the transistors in the CML driver control stage 110. For example, the shunt capacitors 174 and 176 reduce the output impedance momentarily during signal transition to reduce rise time of the CML transmitter 102 output signal.

In the embodiments of FIG. 3, the VML transmitter is protected from the higher voltages of the operating CML transmitter, but the CML transmitter need not be so protected from the voltages of the VML transmitter since the VML supply voltage is sufficiently low. However, in other embodiments using one or more different types of transmitters (e.g., with higher supply or output voltages), each transmitter in the driver 100 can be protected from the operation of the other transmitter similarly as the VML transmitter is protected as explained above.

Figure 4:
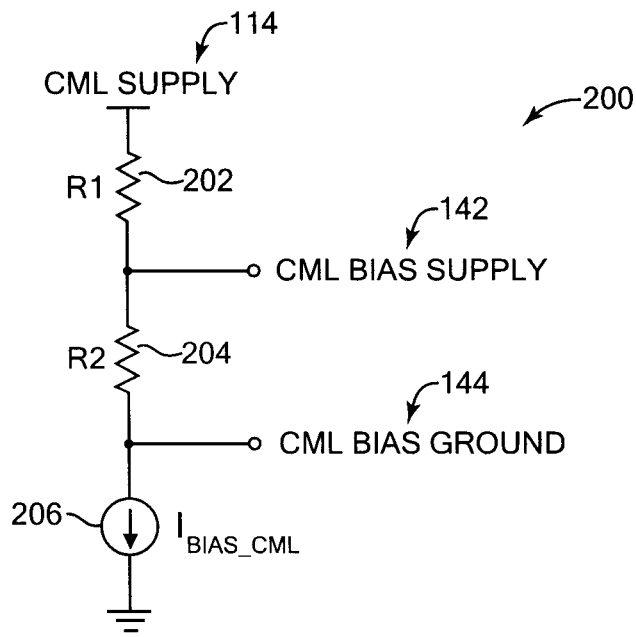
FIG. 4 is a schematic diagram of one example of a biasing circuit which can be used to provide CML bias voltages used in the driver of FIG. 3.

FIG. 4 is a schematic diagram of one example of a biasing circuit 200 which can be used to provide the CML bias voltages used in the driver 100 of FIG. 3. The CML supply 114 is connected to a resistor 202 having a resistance value of R1, which is connected in series to a resistor 204 having a resistance value of R2 in the example shown. Resistor 204 is connected to a variable current source 206 providing a current $I_{BIAS\_CML}$. In some embodiments, the current $I_{BIAS\_CML}$ can be derived (e.g. mirrored) from the reference current source 134 described above with reference to FIG. 3, where the reference current source provides the driving current source 112 of the CML transmitter. This allows the current $I_{BIAS\_CML}$ to track the output amplitude of the CML transmitter 102 to provide the proper bias voltages. In this example, the CML bias supply 142 is connected between the resistor 202 and resistor 204, and the CML bias ground 144 is connected between the resistor 204 and the variable current source 206. The CML bias supply 142 and CML bias ground 144 are provided to the level shifters 136 to bias the CML control inputs 116 so as to avoid breakdown voltages for transistors in the CML driver control stage 110, as described above with reference to FIG. 3. The resistance values R1 and R2 can be chosen such that the CML bias supply voltage range stays sufficiently high enough to turn on and off the functions of the CML driver stage 110 that are responsive to the control inputs 116, while allowing the bias range to track the CML output voltage as its amplitude varies such that transistor breakdown voltage is not exceeded.

Figure 5:
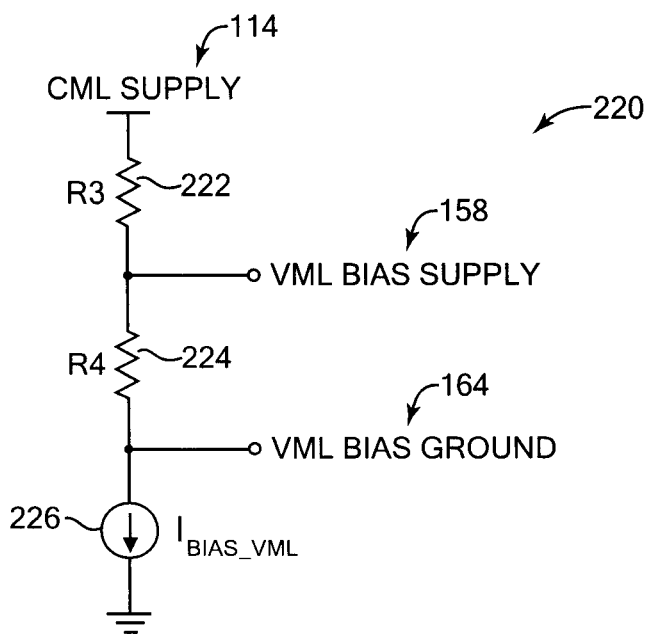
FIG. 5 is a schematic diagram of one example of a biasing circuit which can be used to provide VML bias voltages used in the driver of FIG. 3.

FIG. 5 is a schematic diagram of one example of a biasing circuit 220 which can be used to provide the VML bias voltages used in the driver 100 of FIG. 3. The CML supply 114 is connected to a resistor 222 having a resistance value of R3, which is connected to a resistor 224 having a resistance value of R4 in the example shown. Resistor 224 is connected to a variable current source 226 providing a current $I_{BIAS\_CML}$. Similarly to the biasing circuit 200, the current $I_{BIAS\_CML}$ can be provided from the reference current source 134 described above with reference to FIG. 3. This allows the current $I_{BIAS\_CML}$ to track the output amplitude of the VML transmitter 104 to provide the proper bias voltages. In this example, the VML bias supply 158 is connected between the resistor 222 and resistor 224, and the VML bias ground 164 is connected between the resistor 224 and the variable current source 226. The VML bias supply 158 and VML bias ground 164 are provided to the level shifters 180 to bias the VML control inputs 154 so as to avoid breakdown voltages for transistors in the VML driver control stage 150, as described above with reference to FIG. 3. Resistance values R3 and R4 can be chosen such that the VML bias supply voltage range stays sufficiently high enough to turn on and off the functions of the VML driver stage 150 that are responsive to the control inputs 154, while allowing the bias range to track the VML output voltage as its amplitude varies such that transistor breakdown voltage is not exceeded.

The multi-mode driver 100 combines at least two different types of high-speed data transmitters in a single output driver. In some embodiments, this single driver allows a higher power and lower efficiency mode to be selected for transmission in which one of the transmitters operates, or a lower power and higher efficiency mode to be selected in which the other of the transmitters operates. Such a multi-mode driver avoids the standard method for optimizing power, cost and performance, which is to physically change a transmitter or add additional components such as repeaters or buffers. The driver 100 uses an amplitude-tracking biasing scheme to manage voltage breakdown, such that non-operating transmitter(s) are biased with one or more bias voltages that track varying amplitude of the output of at least one operating transmitter, allowing voltages to be used by the operating transmitter on the common output that would normally exceed the transistor voltage breakdown of one or more non-operating transmitters. Thus signal amplitude can be maximized in one transmitter without voltage breakdown occurring in other transmitters. Furthermore, passive elements at the termination outputs of each transmitter compensate for capacitance contributed by the other transmitter, preventing degradation in rise and fall times of the output signal.

Furthermore, the multi-mode driver 100 is fully software configurable using control inputs to transition between different operational modes, such as between the high power mode and low power mode. This allows easy configuration of the driver 100 once the requirements of the desired transmission channel are known. For example, an optimal configuration can be chosen much later in the design process such as at a system-level characterization, instead of at the initial design stage.

The driver 100 permits optimal power and performance for a given channel. For example, a low power mode can be used for short channels and a high power mode having large output swing with equalization can be used for long channels. The higher power mode can be used, for example, for transmitting on difficult channels where large launch amplitude and high signal fidelity (such as lower EMI and crosstalk) is necessary. The lower power mode can be used, for example, for transmitting on short or medium channel distances or in high port-count designs where power consumption is a priority.

In some embodiments, more than two transmitters, and/or more than two types of transmitters, can be provided in the driver 100, each transmitter selectable for operation. Some embodiments can provide bias voltages to transmitters which are derived from multiple other transmitters.

In some embodiments, some of the control logic and transistors in the stages 110 and 150 of driver 100 can be shared to reduce components or circuitry used to implement the transmitters. Other embodiments can provide separate logic and transistors for greater implementation simplicity.

In some embodiments, the driver 100 can dynamically switch between the transmitter modes based on external criteria, such as current transmission line conditions. For example, the driver 100 may start operating in a high power mode such as CML not knowing the transmission line conditions, then switch to a lower power mode such as VML if a stable channel is determined to exist. In some embodiments, the driver 100 can switch to high power mode if transmission line conditions become more difficult. Some embodiments can provide predictive analysis of line conditions and switching to a more appropriate one of the transmitters of driver 100 in response to designated or predetermined conditions being predicted or met.

Although various examples have been described using specific terms and devices, such description is for illustrative purposes only. The words used are words of description rather than of limitation. In addition, it should be understood that aspects of various other examples may be interchanged either in whole or in part. It is therefore intended that the claims be interpreted in accordance with their true spirit and scope and without limitation or estoppel.

What is claimed is:

1. A multi-mode driver comprising:
a current mode logic (CML) transmitter coupled to a transmission channel and operative to output a signal for transmission on a transmission channel; and
a voltage mode logic (VML) transmitter coupled to the transmission channel and operative to output the signal for transmission on the transmission channel, wherein the VML transmitter comprises a VML bias voltage supply, the VML transmitter having at least one different output characteristic than the CML transmitter,
wherein during the output of the signal from the CML transmitter, the VML transmitter is biased with a bias voltage applied by the VML bias voltage supply, that prevents voltage breakdown of one or more transistors of the VML transmitter.

2. The multi-mode driver as recited in claim 1 wherein the at least one different output characteristic includes a different output power range for each of the CML and VML transmitters.

3. The multi-mode driver as recited in claim 2 wherein the CML transmitter outputs the signal within a higher power range and the VML transmitter outputs the signal within a lower power range, and wherein the VML transmitter is biased with the applied bias voltage.

4. The multi-mode driver as recited in claim 1 wherein the signal is a differential signal, and wherein only one of the CML transmitter and the VML transmitter is outputting the signal at any one time.

5. The multi-mode driver as recited in claim 1 wherein an amplitude of the applied bias voltage tracks a varying amplitude of an output of the CML transmitter.

6. The multi-mode driver as recited in claim 1 wherein the CML transmitter comprises a CML bias voltage supply, and wherein during the output of the signal from the VML transmitter, the CML transmitter is biased with a bias voltage applied by the CML bias voltage supply, that prevents voltage breakdown of one or more transistors of the CML transmitter.

7. The multi-mode driver as recited in claim 1 wherein the CML transmitter and the VML transmitter are each coupled to at least one passive capacitor or inductor to reduce capacitance effects from the VML and CML transmitters on the signal output from the VML and CML transmitters, respectively.

8. The multi-mode driver as recited in claim 1 further comprising at least one level shifter coupled to the VML transmitter, the level shifter shifting control signals using the bias voltage applied by the VML bias voltage supply during operation of the CML transmitter, the control signals input to the VML transmitter.

9. The multi-mode driver as recited in claim 1 wherein control inputs to the VML transmitter switch a voltage supply of the VML transmitter from an operating voltage to the bias voltage applied by the VML bias voltage supply.

10. The multi-mode driver as recited in claim 8 wherein the CML transmitter comprises a CML bias voltage supply, further comprising at least one level shifter coupled to the CML transmitter, the level shifter shifting control signals using a bias voltage applied by the CML bias voltage supply during operation of the CML transmitter, the control signals input to the CML transmitter.

11. The multi-mode driver as recited in claim 1 wherein the CML transmitter includes at least one switch coupled between a CML transmitter supply voltage and the output of the CML transmitter, such that the at least one switch is opened to isolate the CML transmitter supply voltage from the transmission channel during operation of the VML transmitter.

12. The multi-mode driver as recited in claim 1 wherein the CML transmitter includes a current source controlling an amplitude of the signal output from the CML transmitter, wherein the bias voltage applied by the VML bias voltage supply and current from the current source are both derived from a reference current source.

13. A multi-mode driver comprising:
a current mode logic (CML) transmitter coupled to a transmission channel and operative to output a differential signal for transmission on the transmission channel, wherein the CML transmitter outputs the signal within a first power range; and
a voltage mode logic (VML) transmitter coupled to the transmission channel and operative to output the differential signal for transmission on the transmission channel, wherein the VML transmitter comprises a VML bias voltage supply, the VML transmitter outputting the signal within a second power range lower than the first power range, such that only one of the CML transmitter and the VML transmitter is outputting the differential signal at any one time, wherein during the output of the differential signal from the CML transmitter, the VML transmitter is biased with a bias voltage applied by the VML bias voltage supply having an amplitude that tracks a varying amplitude of the output of the CML transmitter, thereby preventing voltage breakdown of one or more transistors of the VML transmitter.

14. The multi-mode driver as recited in claim 13 wherein the CML transmitter comprises a CML bias voltage supply, and wherein during the output of the signal from the VML transmitter, the CML transmitter is biased with a bias voltage applied by the CML bias voltage supply, that prevents voltage breakdown of one or more transistors of the CML transmitter.

15. The multi-mode driver as recited in claim 13 wherein control inputs to the VML transmitter switch a voltage supply of the VML transmitter from an operating voltage to the bias voltage applied by the VML bias voltage supply.

16. The multi-mode driver as recited in claim 13 wherein the CML transmitter includes a current source controlling an amplitude of the signal output from the CML transmitter, wherein the bias voltage applied by the VML bias voltage supply and current from the current source are both derived from a reference current source.

* * * * *